US012304213B2

(12) United States Patent
Karasawa et al.

(10) Patent No.: US 12,304,213 B2
(45) Date of Patent: May 20, 2025

(54) LIQUID CONTAINER

(71) Applicant: SEIKO EPSON CORPORATION, Tokyo (JP)

(72) Inventors: Masahiro Karasawa, Matsumoto (JP); Kazuyuki Hirata, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 161 days.

(21) Appl. No.: 18/217,676

(22) Filed: Jul. 3, 2023

(65) Prior Publication Data

US 2024/0001684 A1 Jan. 4, 2024

(30) Foreign Application Priority Data

Jul. 4, 2022 (JP) ................................ 2022-107643

(51) Int. Cl.
*B41J 2/175* (2006.01)

(52) U.S. Cl.
CPC ....... *B41J 2/17563* (2013.01); *B41J 2/17513* (2013.01); *B41J 2/17523* (2013.01); *B41J 2002/17516* (2013.01); *B41P 2235/31* (2013.01)

(58) Field of Classification Search
CPC ............... B41J 2/17563; B41J 2/17513; B41J 2/17523; B41J 2002/17516; B41J 2/17553; B41P 2235/31
USPC ........................................................ 347/86
See application file for complete search history.

(56) References Cited

FOREIGN PATENT DOCUMENTS

JP 2021084352 A * 6/2021

* cited by examiner

*Primary Examiner* — Jason S Uhlenhake
*Assistant Examiner* — Alexander D Shenderov
(74) *Attorney, Agent, or Firm* — Oliff PLC

(57) ABSTRACT

A liquid container includes: a bag having flexibility configured to store liquid inside; a liquid outlet member attached to one end of the bag and having a liquid outlet section to discharge the liquid to a liquid ejecting apparatus; a spacer member disposed in the bag, the spacer member including a filter chamber in which a filter that filters the liquid is disposed; and a liquid outlet pipe disposed in the bag and coupled to the filter chamber and the liquid outlet member, the liquid outlet pipe being configured to flow the liquid filtered by the filter to the liquid outlet section. The liquid outlet pipe has flexibility.

2 Claims, 11 Drawing Sheets

LIQUID CONTAINER

The present application is based on, and claims priority from JP Application Serial Number 2022-107643, filed Jul. 4, 2022, the disclosure of which is hereby incorporated by reference herein in its entirety.

BACKGROUND

1. Technical Field

The present disclosure relates to a liquid container.

2. Related Art

The liquid container disclosed in JP-A-2021-84352 includes a liquid outlet pipe with an end to which a spacer member having a filter for filtering liquid is attached. The spacer member is coupled by a coupling member to a liquid outlet section for discharging stored liquid to the outside.

In the liquid container in JP-A-2021-84352, the spacer member is fixed to the coupling member. Thus, when the liquid container receives an impact, such as falling of itself, the bag of the liquid container may be pressed by the spacer member from the inner side of the bag, and the liquid container may be damaged.

SUMMARY

According to an aspect of the present disclosure, a liquid container is provided. The liquid container includes: a bag having flexibility configured to store liquid inside; a liquid outlet member attached to one end of the bag and having a liquid outlet section to discharge the liquid to a liquid ejecting apparatus; a spacer member disposed in the bag, the spacer member including a filter chamber in which a filter that filters the liquid is disposed; and a liquid outlet pipe disposed in the bag and coupled to the filter chamber and the liquid outlet member, the liquid outlet pipe being configured to flow the liquid filtered by the filter to the liquid outlet section. The liquid outlet pipe has flexibility.

DESCRIPTION OF EXEMPLARY EMBODIMENTS

A. First Embodiment

A1 Configuration of Liquid Ejecting Apparatus

Figure 1:
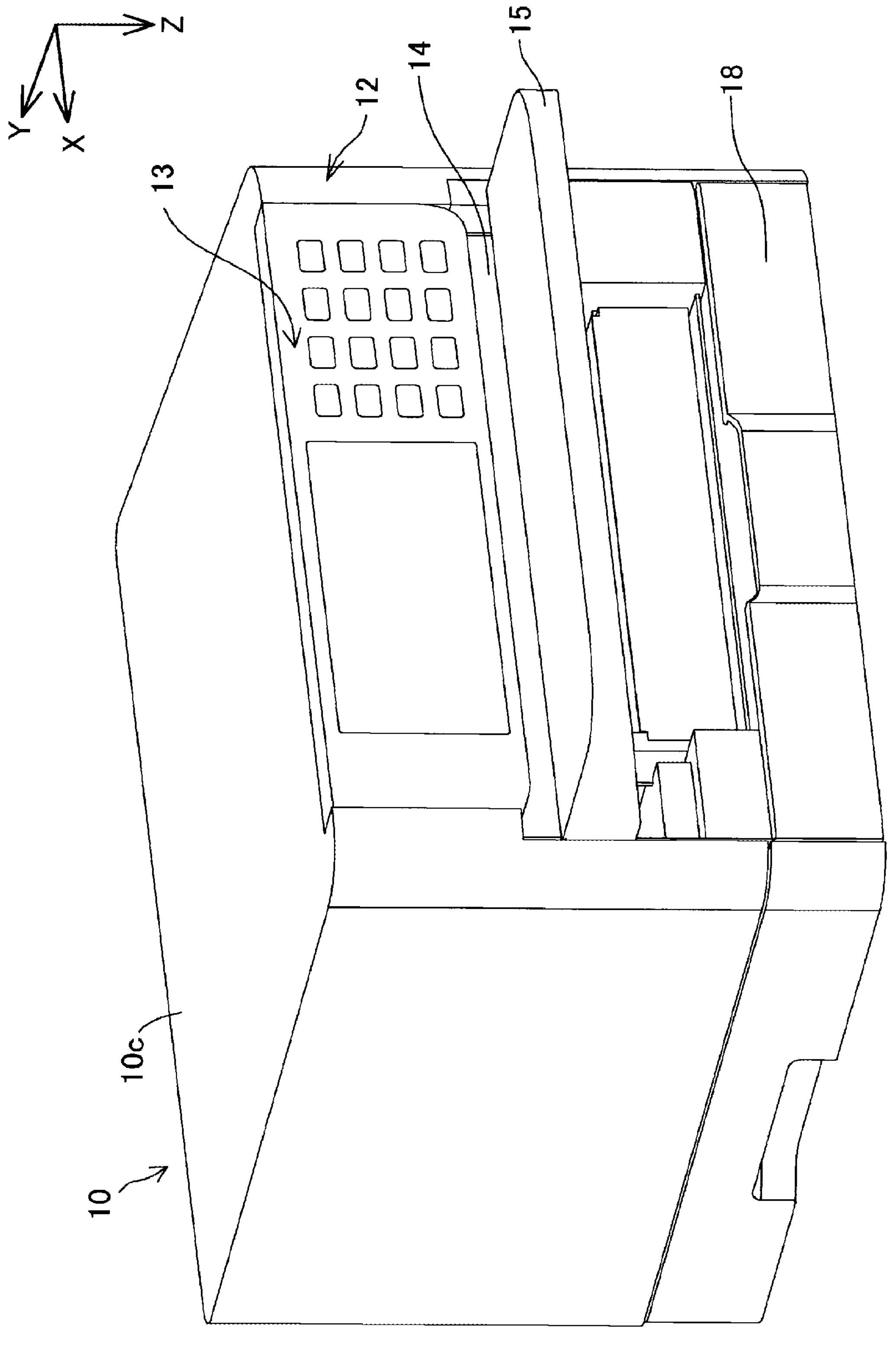
FIG. 1 is a perspective view of a liquid ejecting apparatus.

IG. 1 is a perspective view of a liquid ejecting apparatus 10 in this embodiment. In FIG. 1, arrows X, Y, Z are illustrated, which indicate three directions perpendicular to each other. Note that the arrows X, in the drawings other than FIG. 1 are appropriately illustrated corresponding to those in FIG. 1.

The directions indicated by the arrows X, Y, Z correspond to the arrangement posture of the liquid ejecting apparatus 10 in a normal use state. The normal use state of the liquid ejecting apparatus 10 is the state when the liquid ejecting apparatus 10 is disposed on a horizontal plane and used. Hereinafter, the directions indicated by the arrows X, Y, Z are called "X direction", "Y direction", and "Z direction", respectively. The Z direction is a vertical direction. For the X direction, one direction thereof is called "+X direction", and the other direction is called "−X direction". Similarly, for the Y, Z directions, one directions are called "+Y direction" and "+Z direction", and the other directions are called "−Y direction" and "−Z direction". In the following description, −Y direction is also called "front direction", and +Y direction is also called "rear direction". −X direction is also called "right direction", and +X direction is also called "left direction". −Z direction is also called "upper direction", and +Z direction is also called "lower direction".

The liquid ejecting apparatus 10 is an ink jet printer. The liquid consumed by ejection of the liquid ejecting apparatus 10 is ink. The liquid ejecting apparatus 10 discharges ink drops to form a printed image on a medium MP. The medium MP is, for example, fabric paper and a print sheet. The liquid electing apparatus 10 in this embodiment includes a housing 10*c* that is a hollow resin box body constituting the exterior of the liquid electing apparatus 10. The housing 10*c* has an approximately cuboid shape. A front surface 12 of the housing 10*c* is provided with an operation section 13, a medium discharge port 14, a medium receiving section 15, and a cover member 18.

The operation section 13 has a display that displays information to a user, and a plurality of operation buttons that receive an operation of a user. The medium discharge port 14 is an outlet for the medium MP delivered from the inside of the liquid ejecting apparatus 10. The medium discharge port 14 is a slit-shaped opening having a large width in the X direction. The medium receiving section 15 projects in an eaves shape in −Y direction below the medium discharge port 14, and receives the medium MP discharged through the medium discharge port 14.

The cover member 18 is a plate-like resin member that constitutes part of the exterior of the liquid ejecting apparatus 10. The cover member 18 is detachably attached to the housing 10*c*. The cover member 18 covers and protects mounting bodies 105 illustrated in FIG. 2, which are stored inside the liquid ejecting apparatus 10.

Figure 2:
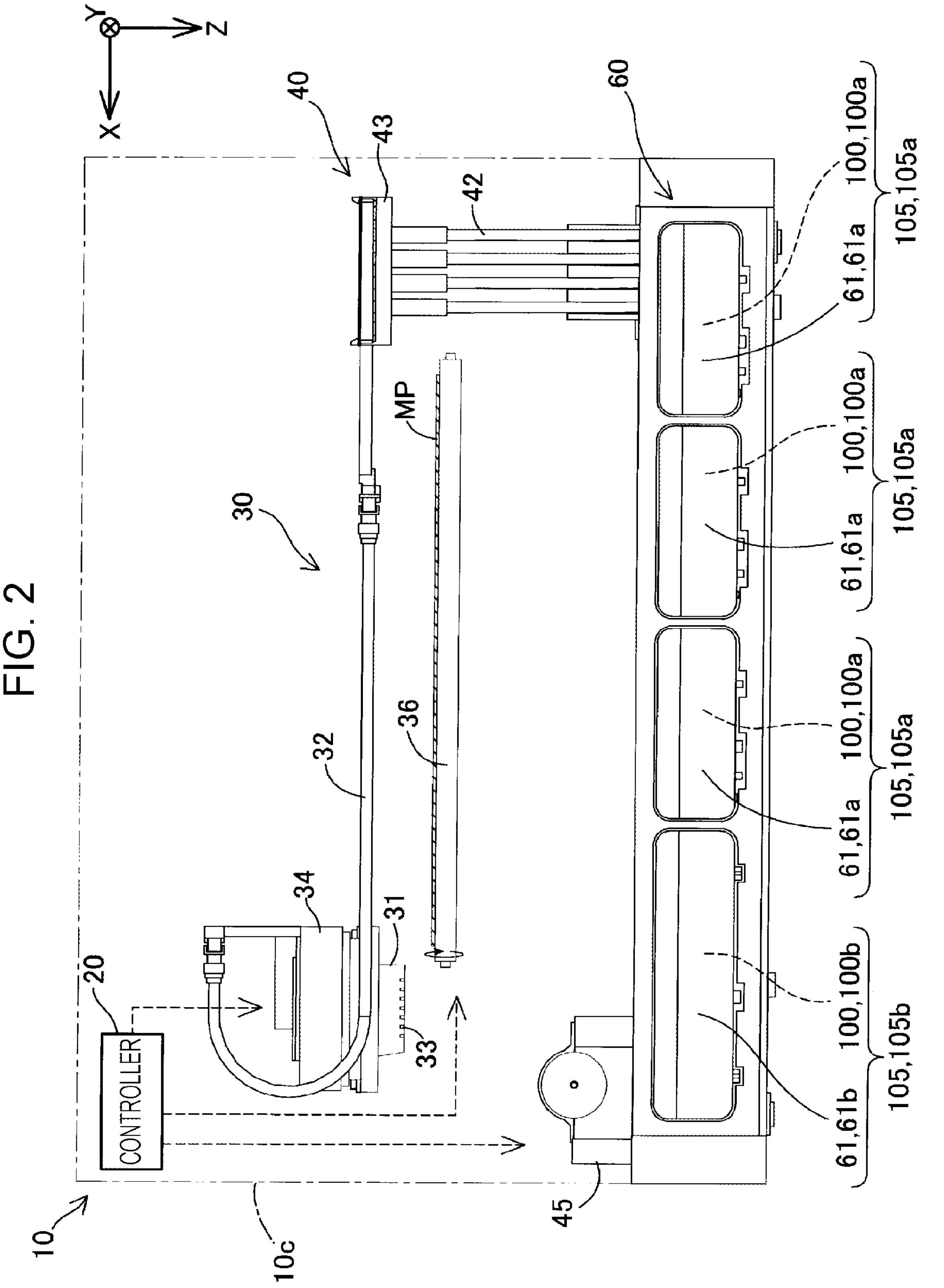
FIG. 2 is a schematic configuration view of the liquid ejecting apparatus as seen from the front.

FIG. 2 is a schematic configuration view of the liquid ejecting apparatus 10 as seen from the front. As illustrated in FIG. 2, the liquid ejecting apparatus 10 includes a controller 20, a discharge executor 30, a transport roller 36, a liquid feeder 40, and a case storage 60.

The case storage 60 is disposed inside the cover member 18 illustrated in FIG. 1 at the bottom of the liquid ejecting apparatus 10. Four mounting bodies 105 are stored in the case storage 60. Specifically, the four mounting bodies 105 include three first mounting bodies 105*a*, and one second mounting body 105*b*. The first mounting bodies 105*a* and the second mounting body 105*b* are different from each other in size. The second mounting body 105*b* is larger than the first mounting bodies 105*a*. The mounting bodies 105 are each comprised of a case 61, and a liquid container 100 stored in the case 61. As in the mounting bodies 105, four cases 61 include three first cases 61*a*, and one second case 61*b*. Four liquid containers 100 include three first liquid containers 100*a*, and one second liquid container 100*b*. The first mounting bodies 105*a* are formed such that the first liquid containers 100*a* are stored in respective first cases 61*a*. The second mounting body 105*b* is formed such that the second liquid container 100*b* is stored in the second case 61*b*. The second liquid container 100*b* is larger than the first liquid containers 100*a*. For example, cyan, magenta, and yellow inks are stored in the respective three first liquid containers 100*a*, and black ink is stored in the second liquid container 100*b*.

The discharge executor 30 includes a liquid discharger 31, a plurality of tubes 32, and a carriage 34. The bottom surface of the liquid discharger 31 is provided with nozzles 33 which are open downward. The liquid discharger 31 discharges liquid through the nozzles 33 through application of pressure to the ink caused by piezoelectric elements, for example. The liquid discharger 31 is mounted on the carriage 34. The carriage 34 linearly moves back and forth in the X direction. The transport roller 36 is installed in the X direction below the liquid discharger 31. The transport roller 36 transports the medium MP. The plurality of tubes 32 are arranged in the Y direction, and coupled to the liquid discharger 31.

The liquid feeder 40 has four feed pipes 42, a joint 43, and a sucker 45. The four feed pipes 42 are coupled to respective four liquid containers 100. The joint 43 is coupled to each of the four feed pipes 42, and each of the plurality of tubes 32. The ink stored in the liquid container 100 is fed to the liquid discharger 31 through the four feed pipes 42, the joint 43, and the plurality of tubes 32. The sucker 45 generates a pressure to deliver the ink from the liquid containers 100 to the feed pipes 42.

The controller 20 controls the driving of each component of the liquid ejecting apparatus 10. The controller 20 is comprised of a microcomputer including at least a central processing unit and a main memory, and implements various types of functions by the central processing unit reading various types of programs into the main memory and executing them.

Figure 3:
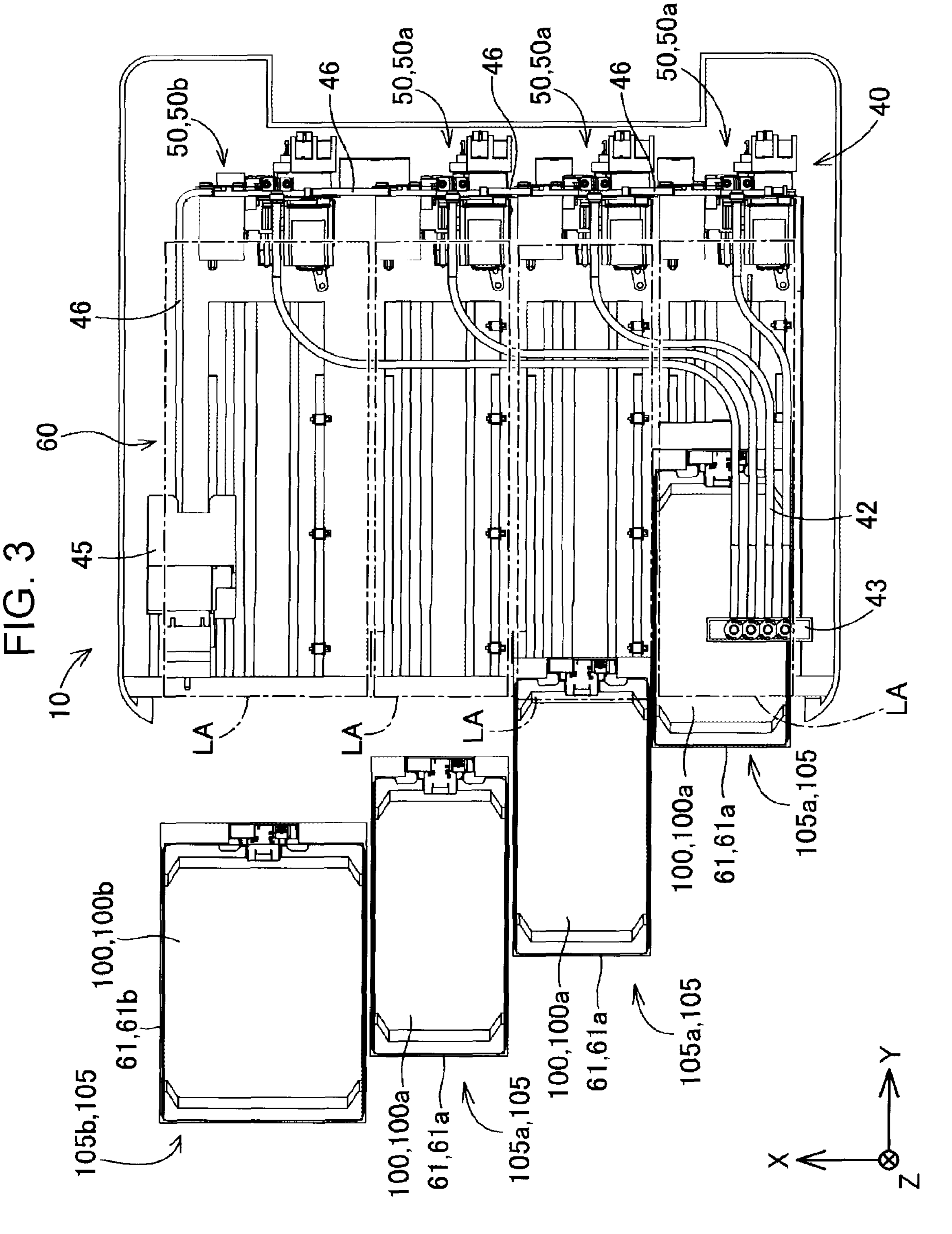
FIG. 3 is a schematic plan view of a liquid feeder as seen from above.
Figure 4:
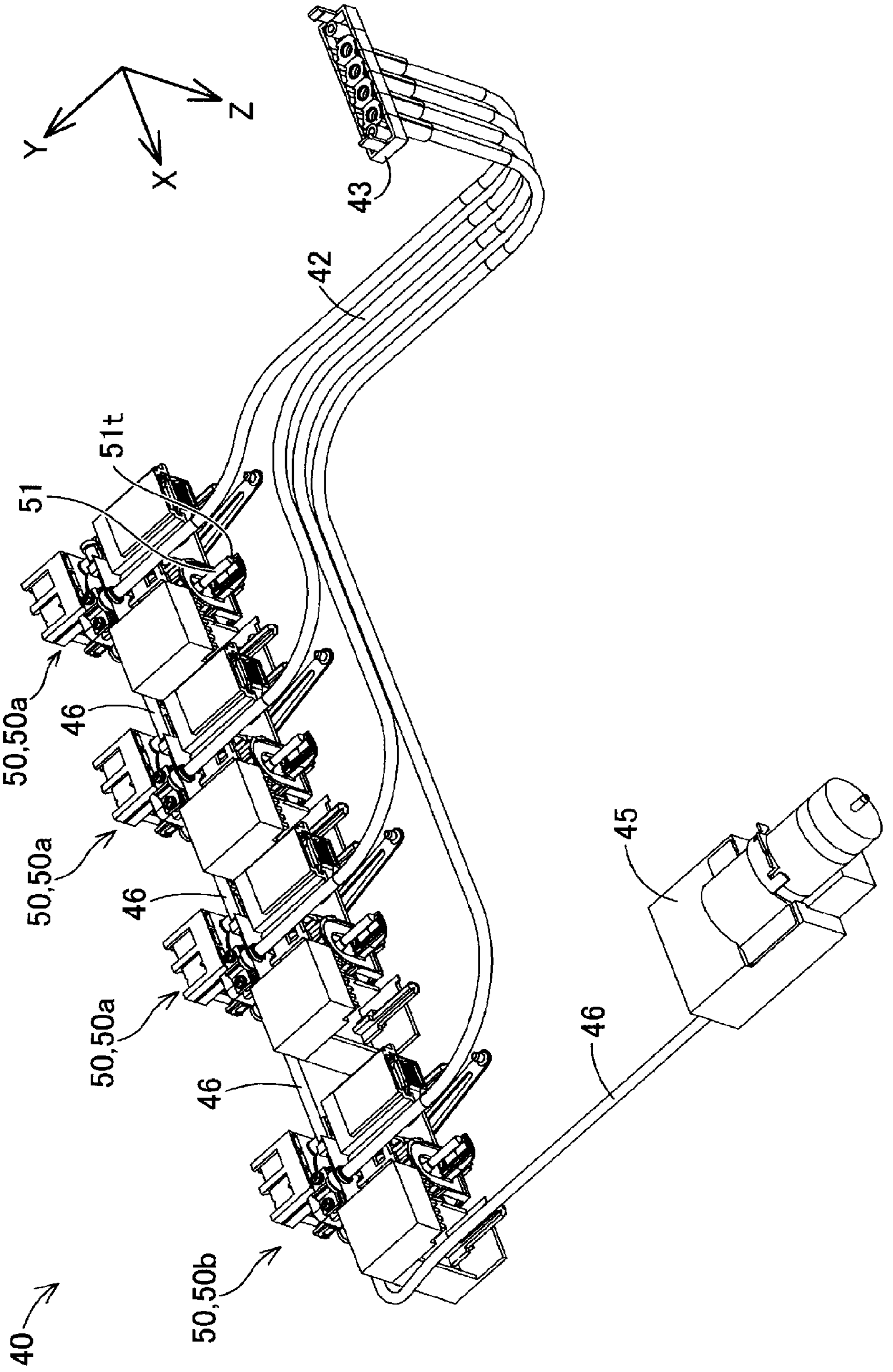
FIG. 4 is a schematic perspective view of the liquid feeder.

FIG. 3 is a schematic plan view of the liquid feeder 40 as seen from above. FIG. 4 is a schematic perspective view of the liquid feeder 40. As illustrated in FIG. 3, the mounting bodies 105 are inserted into the case storage 60 in +Y direction from the outside. The four mounting bodies 105 are arranged in the X direction and stored in the case storage 60. FIG. 3 illustrates, by a dashed-dotted line, arrangement areas LA which are the arrangement positions of the mounting bodies 105 in the case storage 60.

In addition to the above-described components, the liquid feeder 40 has four switching mechanisms 50, and a pressure transmission pipe 46. The four switching mechanisms 50 are disposed on +Y direction side of the arrangement areas LA. The four switching mechanisms 50 are disposed corresponding to respective arrangement areas LA. Specifically, the four switching mechanisms 50 include three first switching mechanisms 50*a*, and one second switching mechanism 50*b*. The three first switching mechanisms 50*a* correspond to respective three first liquid containers 100*a*. The second switching mechanism 50*b* corresponds to the second liquid container 100*b*.

As illustrated in FIG. 4, each switching mechanism 50 has a corresponding feeding needle 51. The feeding needle 51 is detachably attached to a corresponding liquid container 100. The feeding needle 51 has a tubular shape linearly extending in −Y direction. The feeding needle 51 is coupled to a corresponding liquid container 100 by inserting an end 51*t* into the liquid container 100. The ink stored in the liquid container 100 flows through the inside of the feeding needle 51. The pressure transmission pipe 46 transmits the pressure generated by the sucker 45.

A2. Configuration of Liquid Container

Figure 5:
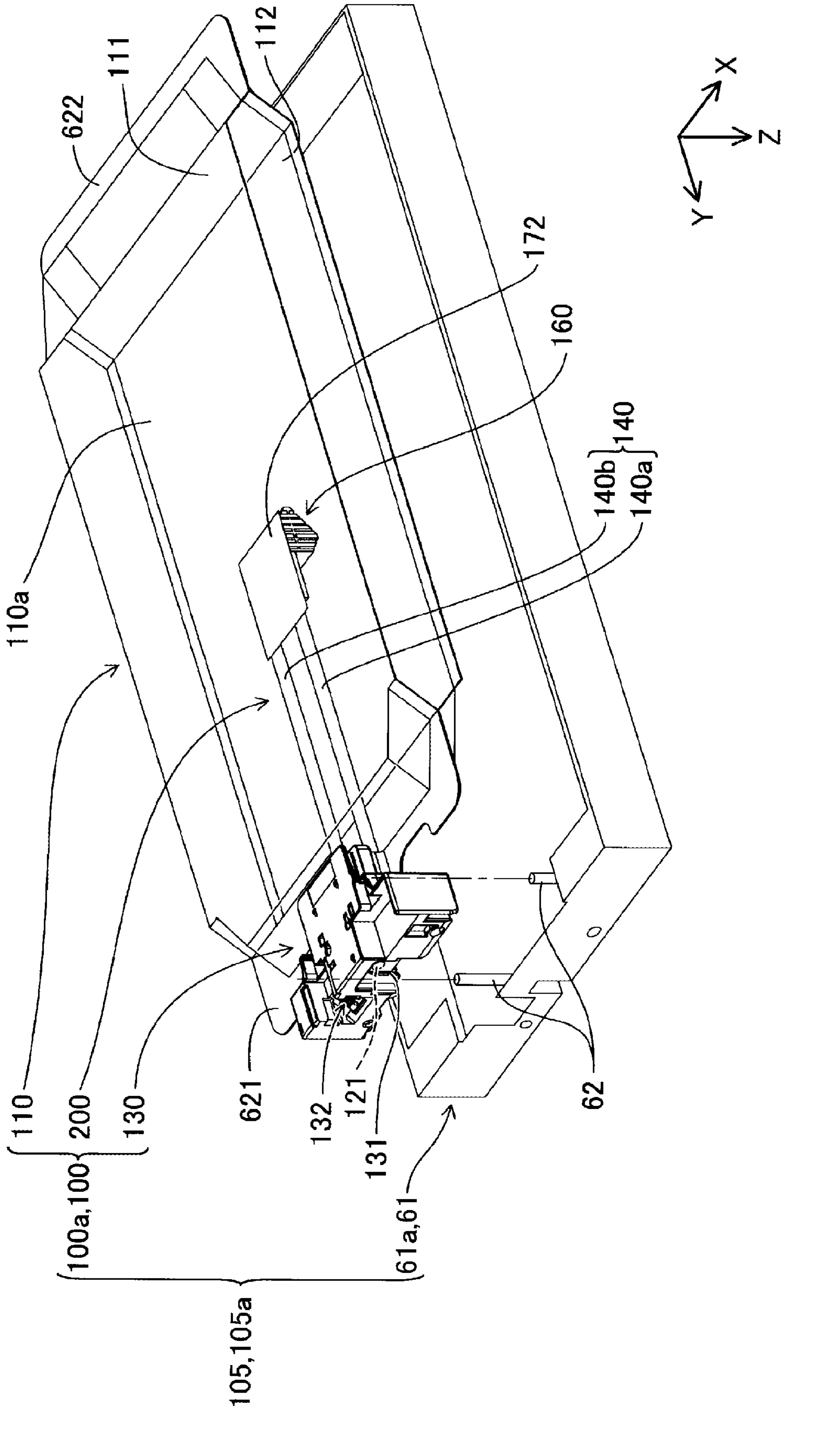
FIG. 5 is a schematic exploded perspective view with a liquid container detached from a case.
Figure 6:
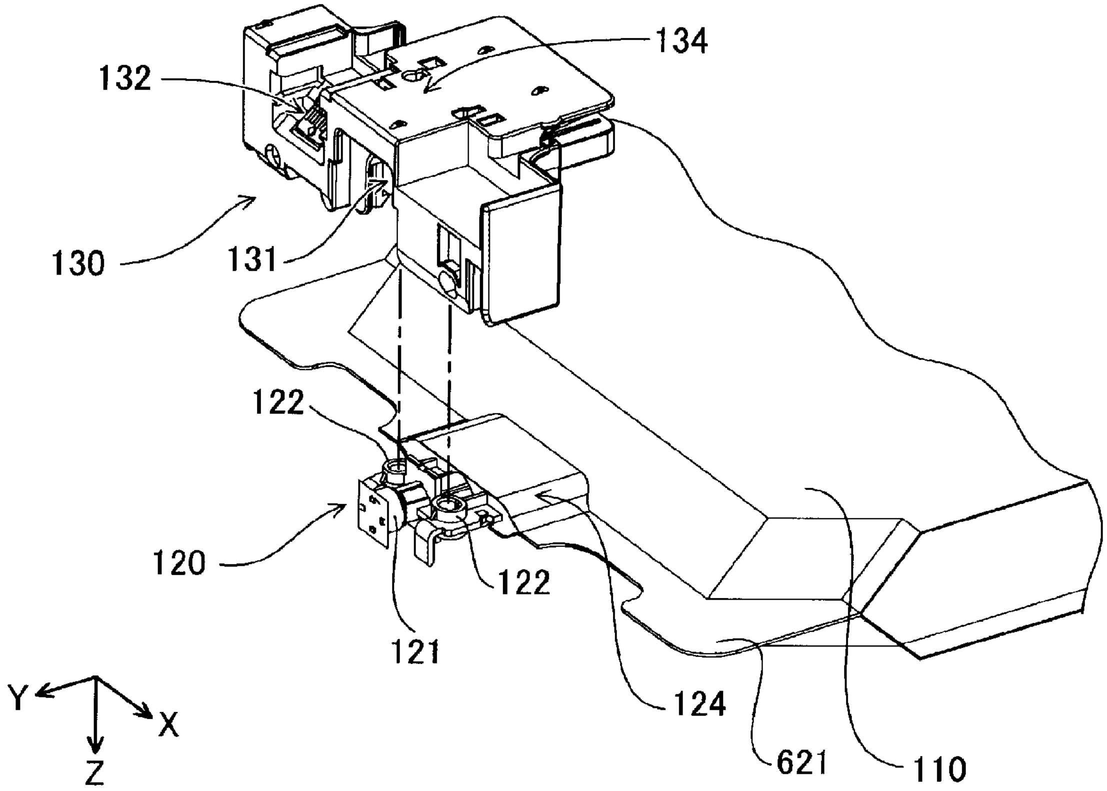
FIG. 6 is a schematic exploded perspective view with an adapter detached from a liquid outlet member.

FIG. 5 is a schematic exploded perspective view with the first liquid containers 100*a* detached from the respective first cases 61*a*. FIG. 6 is a schematic exploded perspective view with the adapter 130 detached from a liquid outlet member 120. The second mounting body 105*b* has the same configuration as that of each first mounting body 105*a*. Thus, in the following, the first mounting body 105*a* will be representatively described, and a description of the second mounting body 105*b* is omitted.

Each case 61 is a tray-shaped container with an upper side opened. The case 61 is produced with, for example, a resin member such as polypropylene. In the case 61, a corresponding liquid container 100 is detachably stored from above. The end of the case 61 in +Y direction is provided with two cylindrical guide sections 62 which stand up from the lower surface of the case 61. When a liquid container 100 is stored in the case 61, the two cylindrical guide sections 62 guide the later-described adapter 130.

The liquid container 100 includes a bag 110 and an adapter 130 illustrated in FIG. 5, an internal structure 200, and a liquid outlet member 120 illustrated in FIG. 6. The bag 110 internally stores ink as liquid. The bag 110 has a long and flat external shape in −Y direction from one end 621 to the other end 622. The bag 110 has a bag shape, and is formed by joining a plurality of films having flexibility together. Specifically, the bag 110 is formed by overlapping a plurality of films, joining parts of peripheral sections, and the other part of peripheral section and the adapter 130 by a method such as thermal welding. In this embodiment, the bag 110 is a so-called gusset bag which is formed by the later-described first surface film 111 and second surface film 112, and two pieces of films which serve as gussets disposed at both ends of the bag 110 in the X direction. Note that the bag 110 is not limited to the gusset type, and may be a so-called pillow bag that is formed by two pieces of films. The films constituting the bag 110 is composed of a material having flexibility and a gas barrier property. For example, as the material for the film, polyethylene terephthalate (PET), nylon, and polyethylene may be mentioned. Alternatively, a film may be formed using a layered structure in which multiple films composed of these materials are layered. In such a layered structure, for example, the outer layer may be composed of PET or nylon superior in impact resistance, and the inner layer may be composed of polyethylene superior in ink-resistance property. Furthermore, a film having a layer deposited with aluminum may be one constituent member of the layered structure.

The bag 110 has the first surface 111 forming the upper surface, and the second surface 112 which forms the bottom surface. The first surface 111 and the second surface 112 are each formed by one piece of film. A liquid storage space is formed by sealing the periphery of the first surface 111 and the second surface 112 which are overlapped. The bag 110 has one end 621, and the other end 622 opposed to the one end 621. The one end 621 is the +Y direction-side end. The other end 622 is the −Y direction-side end. As the liquid in the bag 110 is consumed, the bag 110 is deformed so that the first surface 111 and the second surface 112 approach each other.

Figure 7:
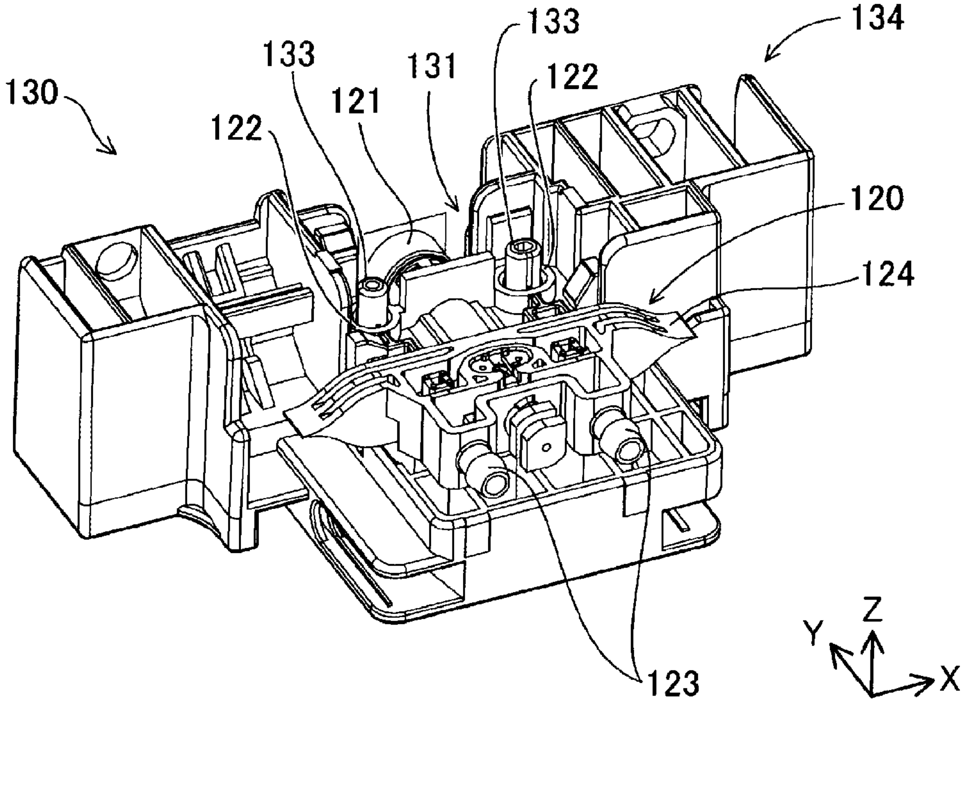
FIG. 7 is a perspective view of the liquid outlet member with the adapter attached.

FIG. 7 is a perspective view of the liquid outlet member 120 with the adapter 130 attached as seen from below.

As illustrated in FIG. 6, the adapter 130 is attached to the liquid outlet member 120 so as to cover it from above. As illustrated in FIG. 7, the upper surface of the adapter 130 is provided with two positioning projections 133 that project in the Z direction. The liquid outlet member 120 is provided with two positioning holes 122 penetrating in the Z direction, through which two respective positioning projections 133 are inserted. The adapter 130 is attached to the liquid outlet member 120 by inserting the two positioning projections 133 into the two respective positioning holes 122.

As illustrated in FIG. 6, the adapter 130 is located near the one end 621 of the bag 110. The adapter 130 has an occluded section 134 with an approximately cuboid shape as an external shape. The adapter 130 is detachably attached to the liquid outlet member 120 welded to the bag 110. The adapter 130 is coupled to the switching mechanisms 50 of the liquid ejecting apparatus 10 in an attached state in which the liquid containers 100 are attached to the liquid ejecting apparatus 10. As illustrated in FIG. 7, the occluded section 134 is located in rear of the liquid outlet member 120 with the adapter 130 attached. As illustrated in FIG. 6, the adapter 130 has a through-hole 131 which is open in +Y direction. The through-hole 131 is a hole penetrating in the Y direction for inserting the later-described liquid outlet section 121 therethrough. The adapter 130 has a coupling terminal 132. The coupling terminal 132 is provided on the surface of a circuit board, for example, and the circuit board includes a memory that stores various types of information on the liquid container 100. The information on the liquid container 100 includes information indicating the type of the liquid container 100, and the amount of stored liquid, for example.

As illustrated in FIG. 7, in addition to the above configuration, the liquid outlet member 120 has the liquid outlet section 121 for delivering liquid to the liquid ejecting apparatus 10, two cylindrical sections 123, and a weld section 124. The liquid outlet member 120 is mounted on the one end 621 of the bag 110.

As illustrated in FIG. 6, the one end 621 of the bag 110 is welded to the weld section 124. As illustrated in FIG. 7, the liquid outlet section 121, and the two cylindrical sections 123 are disposed so as to interpose the weld section 124 therebetween in the Y direction. With the bag 110 welded to the weld section 124, the two cylindrical sections 123 are located within the bag 110, and the liquid outlet section 121 is located outside the bag 110. The liquid outlet section 121 and the two cylindrical sections 123 each have a cylindrical shape with an axial direction parallel to the Y direction. The two cylindrical sections 123 are arranged in the X direction. The internal space of each cylindrical section 123 communicates with the internal space of the liquid outlet section 121. The later-described first liquid outlet pipe **140*a* and second liquid outlet pipe 140*b* illustrated in FIG. 5 are respectively mounted on the two cylindrical sections 123. In the description below, the first liquid outlet pipe 140*a* and the second liquid outlet pipe 140*b* are collectively called the liquid outlet pipe 140. In a brand-new state of the liquid container 100, a film is welded to the leading end of the liquid outlet section 121. When the liquid container 100 is attached to the liquid ejecting apparatus 10, the film welded to the liquid outlet section 121 is pierced by the feeding needles 51**.

Figure 8:
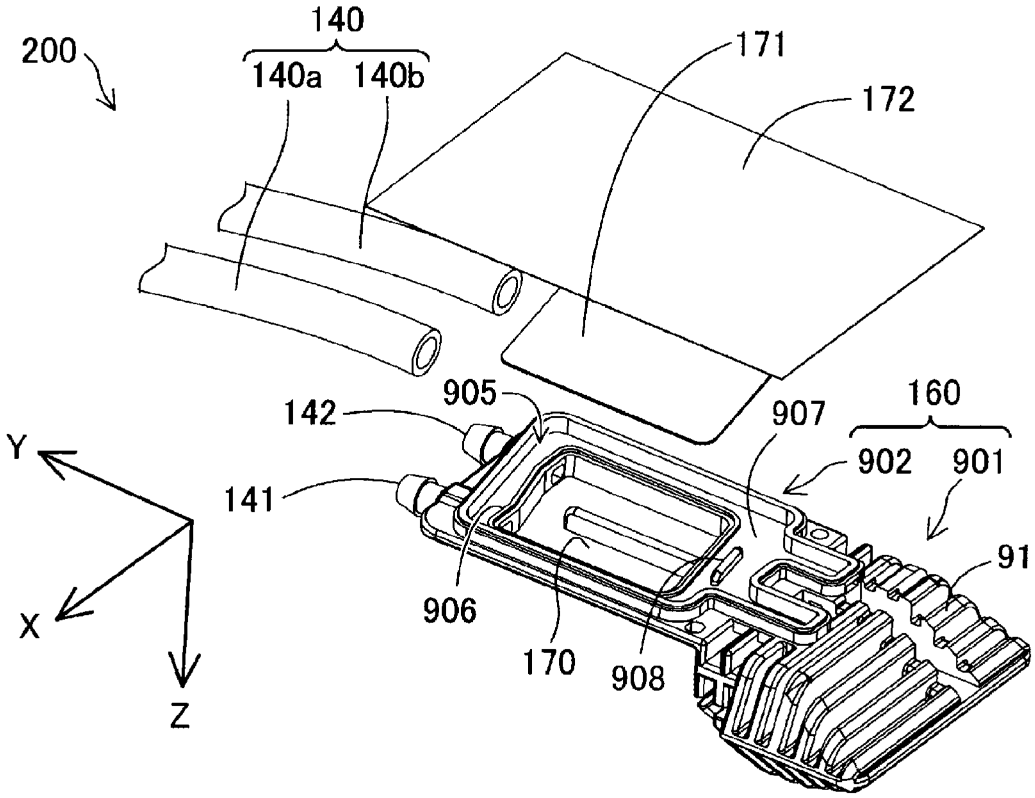
FIG. 8 is an exploded perspective view of an internal structure.
Figure 9:
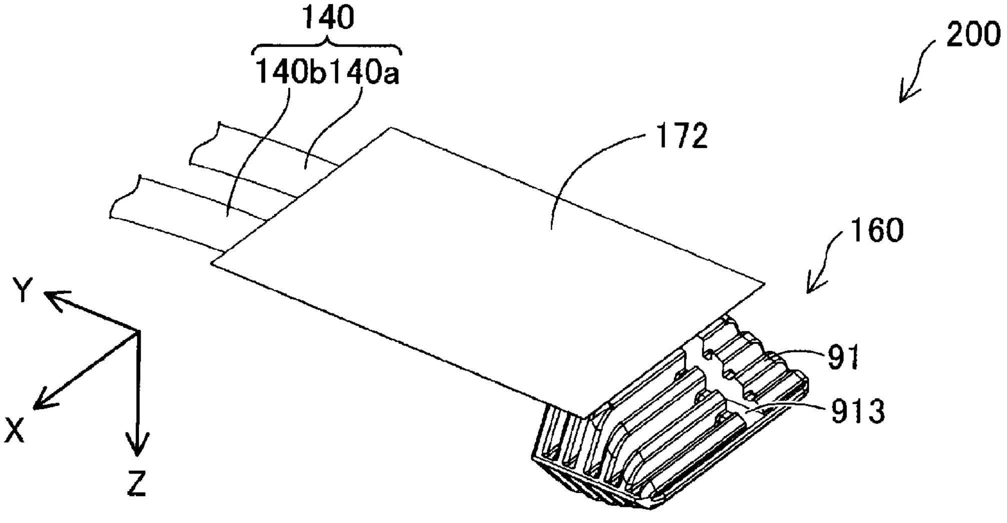
FIG. 9 is a perspective view of the internal structure.
Figure 10:
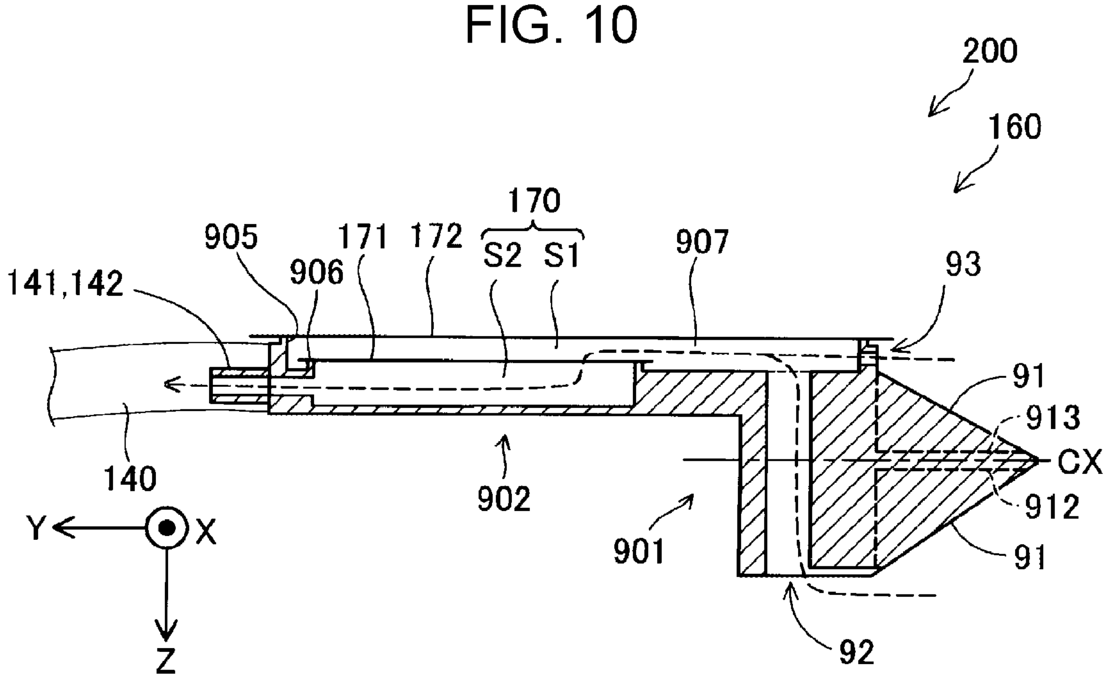
FIG. 10 is a view schematically illustrating the internal structure of the internal structure.
Figure 11:
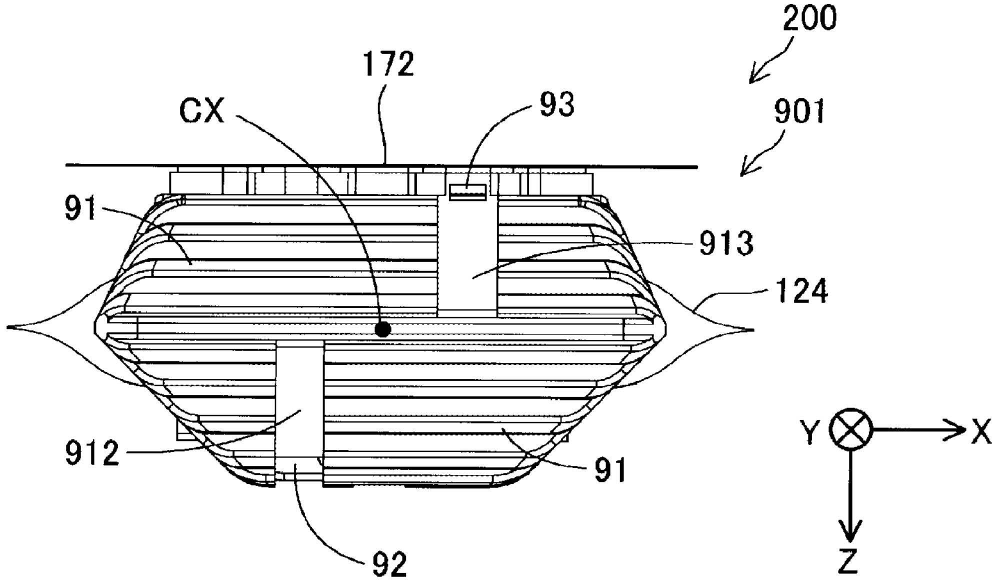
FIG. 11 is a front view of the internal structure.
Figure 12:
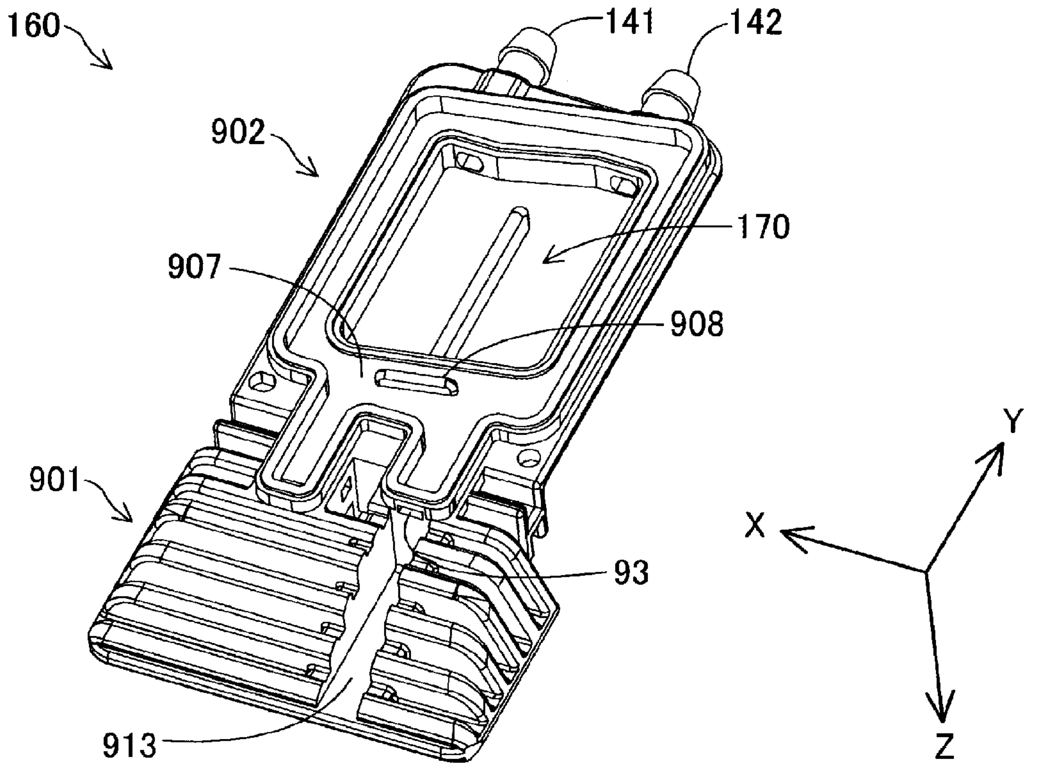
FIG. 12 is a perspective view of a spacer member as seen from above.
Figure 13:
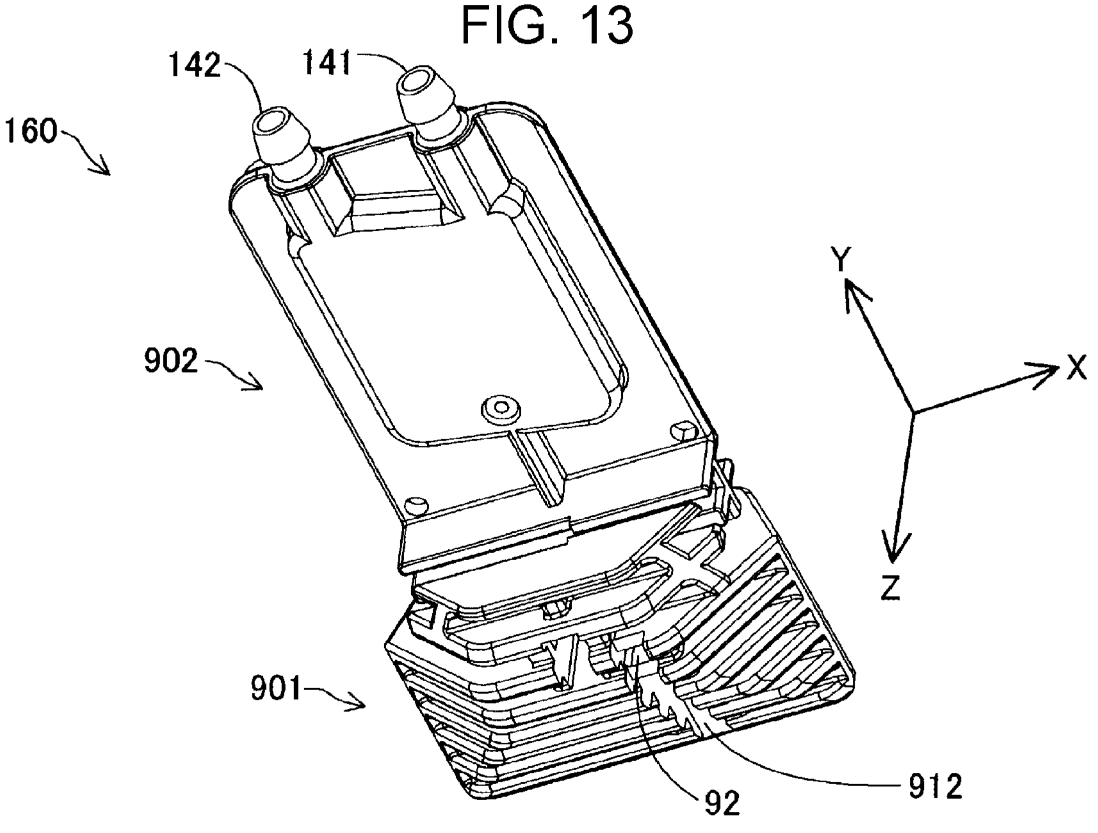
FIG. 13 is a perspective view of the spacer member as seen from below.

FIG. 8 is an exploded perspective view of the internal structure 200. FIG. 9 is a perspective view of the internal structure 200. FIG. 10 is a view schematically illustrating the internal structure of the internal structure 200. FIG. 11 is a front view of the internal structure 200 as seen from the front of the internal structure 200. FIG. 12 is a perspective view of a spacer member 160 as seen from above. FIG. 13 is a perspective view of the spacer member 160 as seen from below. FIG. 12 and FIG. 13 illustrate the spacer member 160 with the later-described filter 171 and film 172 not joined together.

As illustrated in FIG. 8, the internal structure 200 has a plurality of liquid outlet pipes 140, the spacer member 160, a filter 171, and a film 172. The spacer member 160 is mounted on the end of the liquid outlet pipe 140. The filter 171 and the film 172 are mounted on the spacer member 160.

As illustrated in FIG. 5, the plurality of liquid outlet pipes 140 are coupled to the liquid outlet member 120, and is disposed in a liquid storage **110*a* which is the internal space of the bag 110. The plurality of liquid outlet pipes 140 include the first liquid outlet pipe 140*a* and the second liquid outlet pipe 140*b*. Each liquid outlet pipe 140 is a tube having flexibility. As the material for each liquid outlet pipe 140, for example, a synthetic resin, such as elastomer and polypropylene, may be used. The material for each liquid outlet pipe 140 is preferably a material having no reactivity with the ink in the bag 110. In this embodiment, the material for each liquid outlet pipe 140 is elastomer. Since each liquid outlet pipe 140 has flexibility, even when it receives an impact, such as falling of the liquid container 100, the liquid outlet pipe 140 can be bent in response to an external force, thus the bag 110** can be protected from being damaged due to pressing from the inside.

The spacer member 160 is a structure to define a region with a certain volume in the liquid storage **110*a* of the bag 110. The spacer member 160 regulates contraction of the bag 110 in its thickness direction. The spacer member 160** is composed of, for example, a synthetic resin, such as polyethylene, and polypropylene.

As illustrated in FIG. 8, the spacer member 160 has a regulation structure 901, and a filter 902. The regulation structure 901 and the filter 902 are arranged to be in contact with each other in the Y direction. In this embodiment, the regulation structure 901 and the filter 902 are integrally molded; however, the regulation structure 901 and the filter 902 may be formed separately, then integrally joined or assembled.

The regulation structure 901 is a component that implements the function as a spacer that regulates contraction of the bag 110 in its thickness direction. The regulation structure 901 has a roughly pointed shape such that the thickness in the Z direction decreases at the position closer to the leading end in −Y direction. As illustrated in FIG. 10, the regulation structure 901 has an inclined surface 91 oriented in −Z direction, and an inclined surface 91 oriented in +Z direction. The two inclined surfaces 91 are inclined with respect to the XY plane. The inclined surface 91 oriented in −Z direction is inclined so as to be located forward in +Z direction along −Y direction. The inclined surface 91 oriented in +Z direction is inclined so as to be located forward in −Z direction along −Y direction.

As illustrated in FIG. 8, in this embodiment, in each of the two inclined surfaces 91, a plurality of grooves extending in the X direction are formed. Note that in this embodiment, "surface" refers to not only a surface comprised of a plane only, but also a surface with a groove or a recess formed thereon, a surface with a projection or a convex section formed thereon, and a virtual surface surrounded by a frame. In other words, when being recognized as a "surface" as a whole, a surface may have a recess, a convex section, or a through-hole in a certain area of the surface.

As illustrated in FIG. 8, the filter 902 has a filter chamber 170. As illustrated in FIG. 10, the filter chamber 170 is a section recessed in +2, direction relative to the upper surface the spacer member 160. The filter chamber 170 is defined by sealing an opening 905 with the film 172. The film 172 is welded to the edge of the opening 905.

As illustrated in FIG. 10, the filter 171 that filters liquid is disposed in the filter chamber 170. As illustrated in FIG. 8, the sidewall that defines the filter chamber 170 is provided with an inner peripheral section 906 to weld the filter 171. The filter 171 is welded to the inner peripheral section 906. In this embodiment, the filter 171 is mounted parallel to the XY plane.

As illustrated in FIG. 10, the filter chamber 170 is partitioned by the filter 171 into an upper space S1 and a lower space S2. In this embodiment, the filter 171 to filter liquid is formed with a metal mesh manufactured by SUS. The filter 171 may be formed with metal non-woven fabric. The filter 171 removes the foreign materials mixed in the bag 110 or the foreign materials produced in the bag 110.

The spacer member 160 further includes a first liquid inlet 92 and a second liquid inlet 93 which communicate with the filter chamber 170. The first liquid inlet 92 and the second liquid inlet 93 are openings for introducing liquid into the filter chamber 170. More specifically, the first liquid inlet 92 and the second liquid inlet 93 communicate with the upper space S1 of the filter chamber 170. The flow path for the first liquid inlet 92, and the flow path for the second liquid inlet 93 are merged at a merging section 907 located upstream of the upper space S1. As illustrated in FIG. 8 and FIG. 12, the merging section 907 is provided with a rib 908 which projects in −Z direction from the bottom surface which defines the merging section 907. Since the rib 908 is provided, the film 172 can be prevented from coming into contact with the bottom surface defining the merging section 907.

As illustrated in FIG. 10, the first liquid inlet 92, and the second liquid inlet 93 are disposed at different positions in the height direction with the liquid container 100 in use. Specifically, the second liquid inlet 93 is disposed at a position higher than the first liquid inlet 92 in the Z direction with the liquid container 100 in use. Therefore, when the liquid contains sedimentation components, the liquid having a low concentration in an upper portion in the bag 110, and the liquid having a high concentration in a lower portion in the bag 110 are mixed within the spacer member 160, and can be fed to the liquid ejecting apparatus. Thus, the concentration of liquid to be fed to the liquid ejecting apparatus 10 can be stabilized. The second liquid inlet 93 is −Y direction-side end of the filter chamber 170, and is formed to be oriented in −Y direction near the upper end of the regulation structure 901. In contrast, the first liquid inlet 92 is formed to be oriented in +Z direction near the lower end of the regulation structure 901. In this embodiment, the opening area of the first liquid inlet 92 is larger than the opening area of the second liquid inlet 93. The opening area is the area of a portion where a corresponding inlet is opened oriented to the space within the bag 110. Thus, the flow path resistance of the first liquid inlet 92 can be made lower than the flow path resistance of the second liquid inlet 93. Therefore, when the liquid contains sedimentation components, the liquid having a high concentration in a lower portion in the bag 110 rather than the liquid in an upper portion in the bag 110 can be preferentially fed to the liquid ejecting apparatus 10.

As illustrated in FIG. 11, the regulation structure 901 further includes a first groove 912 and a second groove 913 which extend in the Y direction. As illustrated in FIG. 13, the first groove 912 is formed in the inclined surface 91 oriented in +Z. The first groove 912 is formed over the range from the −Y direction end of the regulation structure 901 to the first liquid inlet 92 in the Y direction. Similarly, as illustrated in FIG. 12, the second groove 913 is formed in the inclined surface 91 oriented in −Z. The second groove 913 is formed over the range from the −Y direction end of the regulation structure 901 to the second liquid inlet 93 in the Y direction. As illustrated in FIG. 11, the first groove 912 is formed to be recessed in −Z direction from the inclined surface 91 oriented in +Z. The bottom surface of the first groove 912 is approximately parallel to the XY plane, and close to the XY plane passing through the central axis CX of the regulation structure 901. Similarly, the second groove 913 is formed to be recessed in +Z direction from the inclined surface 91 oriented in −Z. The bottom surface of the second groove 913 is approximately parallel to the XY plane, and close to the XY plane passing through the central axis CX. As illustrated in FIG. 10, since the first groove 912 is formed, the liquid in front of the first liquid inlet 92 in the liquid container 100 is passed through the first groove 912, and is introduced into the first liquid inlet 92. Similarly, since the second groove 913 is formed, the liquid in front of the second liquid inlet 93 is passed through the second groove 913, and is introduced into the second liquid inlet 93. Thus, since the first groove 912 and the second groove 913 are formed, it is possible to facilitate introduction of the liquid into the first liquid inlet 92 and the second liquid inlet 93.

As illustrated in FIG. 8, two tubular second convex sections 141, 142 are disposed side by side in the X direction at the +Y direction end of the filter 902. As illustrated in FIG. 10, respective internal spaces of the second convex sections 141, 142 communicate with the lower space S2 of the filter chamber 170. As illustrated in FIG. 8, the first liquid outlet pipe 140*a* and the second liquid outlet pipe 140*b* are coupled to the second convex sections 141, 142, respectively.

As illustrated in FIG. 10, liquid streams flowing in through the first liquid inlet 92 and the second liquid inlet 93 are merged at the merging section 907, then flow from the upper space S1 into the lower space S2 through the filter 171. Thus, the liquid is filtered by the filter 171. The streams of liquid filtered by the filter 171 flow through the second convex sections 141, 142, each liquid outlet pipe 140, and the flow path of each cylindrical section 123, and are merged in the liquid outlet member 120, then are discharged to the outside from the liquid outlet section 121. Thus, the liquid with foreign material removed can be fed to the liquid ejecting apparatus 10.

According to the first embodiment described above, each liquid outlet pipe 140 has flexibility, thus when receiving an impact, it can be bent in response to an external force received, and the bag 110 can be protected from being damaged from the inside by the spacer member 160.

B. Second Embodiment

Figure 14:
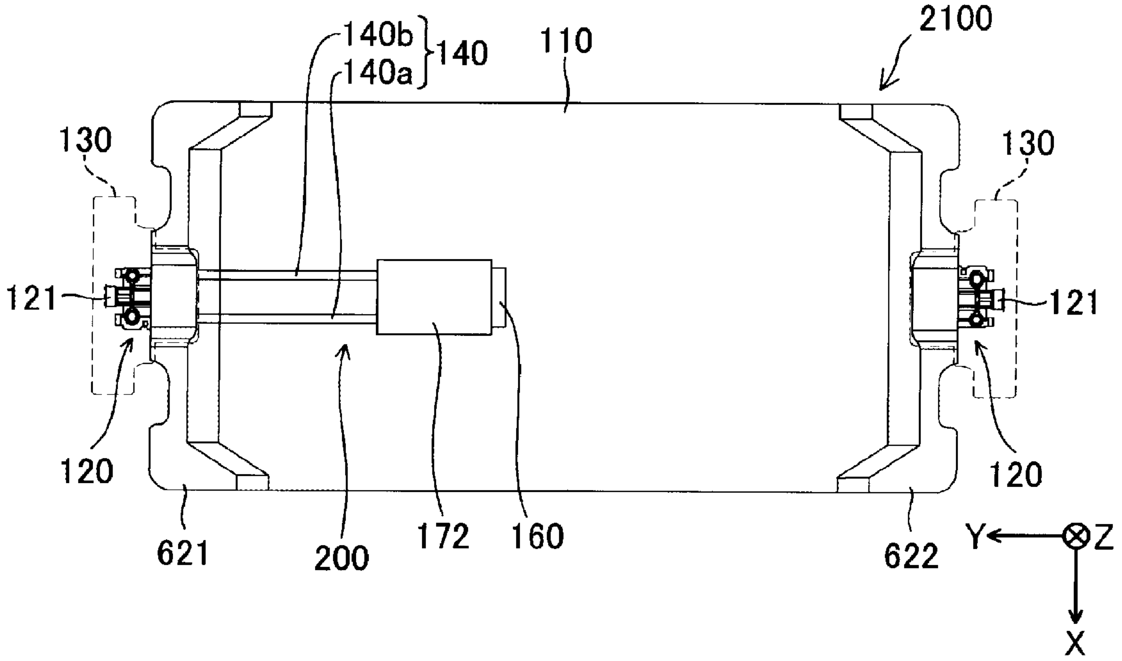
FIG. 14 is a plan view of a liquid container according to a second embodiment.

FIG. 14 is a plan view of a liquid container 2100 according to a second embodiment. In this embodiment, the liquid container 2100 is designed to be reused by refilling it with liquid after the liquid stored in the liquid container 2100 is consumed. As illustrated in FIG. 14, the liquid container 2100 according to this embodiment differs from the liquid container 100 according to the first embodiment in that the liquid container 2100 has two liquid outlet members 120 and two adapters 130 The same components as in the first embodiment are labeled with the same symbol, and a detailed description is omitted as needed.

In this embodiment, a liquid outlet member 120 is mounted on one end 621 of the liquid container 2100 and a liquid outlet member 120 is mounted on the other end 622 of the liquid container 2100. As in the first embodiment, an internal structure 200 is mounted on the liquid outlet member 120 which is mounted on the one end 621. In contrast, an internal structure 200 is not mounted on the liquid outlet member 120 which is mounted on the other end 622. As described above, the liquid outlet member 120 mounted on the other end 622 includes the liquid outlet section 121 as a liquid flow path section in which a liquid flow path in communication with the inside of the bag 110 is formed.

Since the liquid outlet member 120 is mounted on the other end 622, after the liquid stored in the liquid container 100 is consumed, the bag 110 can be refilled with liquid through the liquid outlet section 121 of the liquid cutlet member 120 mounted on the other end 622. Furthermore, by refilling the bag with liquid using the liquid outlet member 120 mounted on the other end 622, in a process of feeding liquid for refilling to the liquid ejecting apparatus 10, foreign materials can be properly removed from the liquid using the filter 171.

When liquid refill is performed through the liquid outlet section 121 mounted on the one end 621, and foreign materials are contained in liquid, the foreign materials are trapped by the filter 171 illustrated in FIG. 10, and remain in the lower space S2. In a process of feeding liquid to the liquid ejecting apparatus 10, the foreign materials remained in the lower space S2 are sent to the liquid ejecting apparatus 10. In this regard, according to this embodiment, even when foreign materials are contained in the liquid for refilling, the bag 110 is filled with the liquid for refilling without going through the internal structure 200. Therefore, in a process of feeding liquid to the liquid ejecting apparatus 10, the foreign materials contained in the liquid can be removed by the filter 171.

In this embodiment, the adapter 130 is attached to the liquid outlet member 120 mounted on the other end 622. Thus, the liquid outlet section 121 of the other end 622 can be protected. The liquid outlet member 120 mounted on the other end 622 is the same as the liquid outlet member 120 mounted on the one end 621. Therefore, the liquid outlet member 120 can be used in common, thus increase in the manufacturing cost can be prevented.

According to the second embodiment described above, the liquid container 2100 includes the liquid outlet member 120 mounted on the other end 622 in communication with the inside of the bag 110, separately other than the liquid outlet member 120 at the one end 621 on which the internal structure 200 is mounted. Thus, the liquid for refilling can be poured to the liquid container 2100 through the liquid outlet section 121 at the other end 622 without going through the filter 171. Also, the liquid outlet section 121 used for refilling is mounted on the other end 622. Thus, the liquid container 2100 can be used in the existing liquid ejecting apparatus 10 by changing the length of the bag 110 from the one end 621 to the other end 622.

C. Third Embodiment

Figure 15:
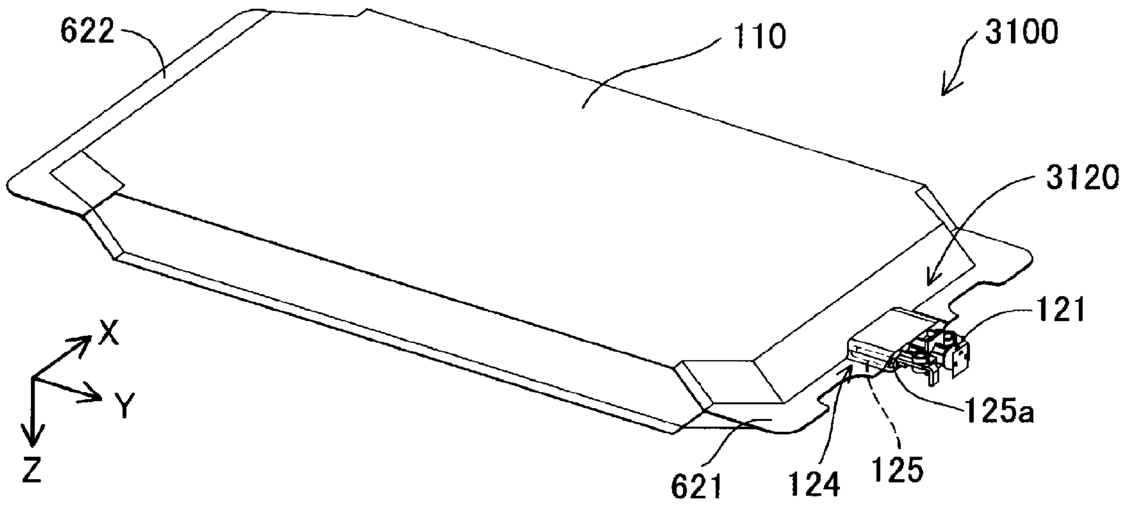
FIG. 15 is a perspective view of a liquid container according to a third embodiment.
Figure 16:
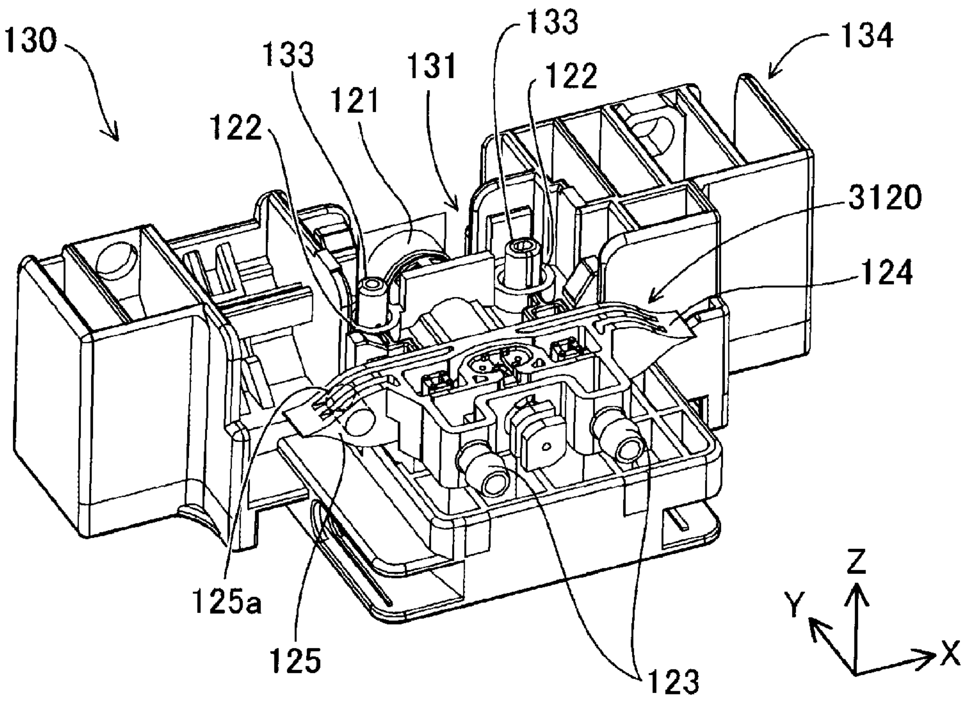
FIG. 16 is a perspective view of a liquid outlet member with an adapter attached according to the third embodiment.

FIG. 15 is a perspective view of a liquid container 3100 according to a third embodiment. FIG. 16 is a perspective view of a liquid outlet member 3120 with an adapter 130 attached according to the third embodiment. Also, in this embodiment, the liquid container 3100 is designed to be reused by refilling it with liquid after the liquid stored in the liquid container 3100 is consumed. As illustrated in FIG. 15, the liquid container 3100 according to this embodiment differs from the liquid container 100 according to the first embodiment in that the liquid outlet member 3120 is provided with a liquid flow path section 125. The same components as in the first embodiment are labeled with the same symbol, and a detailed description is omitted as needed.

As illustrated in FIG. 15, the liquid flow path section 125 is formed in the liquid outlet member 3120. Specifically, as illustrated in FIG. 16, the liquid flow path section 125 is located at the end of the weld section 124 in −X direction. The through-hole of the liquid flow path section 125 penetrating in the Y direction is a flow path for the liquid in communication with the inside of the bag 110. The liquid flow path section 125 has a flow path port 125*a* which is opened in the liquid outlet member 3120, specifically, the surface of the weld section 124. A film (not illustrated) is welded to the flow path port 125*a*. By providing the liquid outlet member 3120 with the liquid flow path section 125, after the liquid stored in the liquid container 3100 is consumed, the bag 110 can be refilled with liquid through the liquid flow path section 125. Furthermore, by refilling the bag 110 with liquid using the liquid flow path section 125, as in the second embodiment, in a process of feeding liquid for refilling to the liquid ejecting apparatus 10, foreign materials can be properly removed from the liquid using the filter 171. Note that when liquid refill is performed, the film welded to the flow path port 125*a* is removed, then the bag 110 is refilled with liquid, and subsequently, a film is welded to the flow path port 125*a* again.

As illustrated in FIG. 16, the occluded section 134 of the adapter 130 covers the flow path port 125*a*. Thus, the flow path port 125*a* can be protected. In addition, since the flow path port 125*a* is covered by the occluded section 134, the flow path port 125*a* is difficult to be visually recognized, thus occurrence of accidental contact with the flow path port 125*a* by a user can be reduced.

According to the third embodiment described above, the liquid outlet member 3120 has the liquid flow path section 125, separately other than the liquid outlet section 121. Therefore, the liquid for refilling can be poured to the liquid container 3100 through the liquid flow path section 125 without going through the filter 171. Since the adapter 130 has the occluded section 134 that covers the flow path port 125*a*, the flow path port 125*a* can be protected.

D. Other Embodiments (D1) In the second embodiment, the liquid outlet member 120 for refill is mounted on the other end 622. The mounting position of the liquid outlet member 120 is not limited to the other end 622, and may be, for example, a side of the bag 110 parallel to the Y direction.

E. Other Aspects

The present disclosure is not limited to the foregoing embodiments and can be implemented with various configurations within a scope not departing from the spirit. For example, the technical features in the foregoing embodiments, corresponding to the technical features of the configurations described below may be replaced, or combined as appropriate to solve some or all of the problems described above or to achieve some or all of the effects of described above. Unless technical features are explained in the present specification as essential ones, they can be omitted as appropriate.

(1) According to a first aspect of the present disclosure, a liquid container is provided. The liquid container includes: a bag having flexibility configured to store liquid inside; a liquid outlet member attached to one end of the bag and having a liquid outlet section to discharge the liquid to a liquid ejecting apparatus; a spacer member disposed in the bag, the spacer member including a filter chamber in which a filter that filters the liquid is disposed; and a liquid outlet pipe disposed in the bag and coupled to the filter chamber and the liquid outlet member, the liquid outlet pipe being configured to flow the liquid filtered by the filter to the liquid outlet section. The liquid outlet pipe has flexibility. According to this aspect, the liquid outlet pipe has flexibility, thus when receiving an impact, it is bent in response to an external force received, and the bag can be protected from being damaged from the inside by the spacer member.

(2) The liquid container in the above-mentioned aspect may further comprise a liquid flow path section in which a flow path for the liquid is formed, the liquid flow path section being provided separately from the liquid outlet section and communicating with an inside of the bag. According to this aspect, the liquid flow path section is provided separately from the liquid outlet section, thus liquid for refill can be poured to the liquid container through the liquid flow path section without passing through the filter.

(3) The liquid container in the above-mentioned aspect, the liquid flow path section may be mounted on the other end of the bag, opposed to the one end of the bag. According to this aspect, the bag can be used for an existing liquid ejecting apparatus by changing the length of the bag from the one end to the other end.

(4) The liquid container in the above-mentioned aspect, the liquid flow path section may be formed in the liquid outlet member. According to this aspect, the flow path port can be provided without adding a member.

(5) The liquid container in the above-mentioned aspect may further comprise an adapter detachably attached to the liquid outlet member, the adapter being configured to couple the liquid outlet member to the liquid ejecting apparatus. The liquid flow path section may have a flow path port which is opened in a surface of the liquid outlet member, and the adapter may have an occluded section that covers the flow path port. According to this aspect, the flow path port can be protected by the occluded section.

In addition to the above-described aspects, the present disclosure can be implemented as a form of a method for manufacturing a liquid container, and a liquid ejecting system including a liquid ejecting apparatus and a liquid container.

What is claimed is:

1. A liquid container comprising:

a bag having flexibility configured to store liquid inside;

a liquid outlet member attached to one end of the bag and having a liquid outlet section to discharge the liquid to a liquid ejecting apparatus;

a spacer member disposed in the bag, the spacer member including a filter chamber in which a filter that filters the liquid is disposed;

a liquid outlet pipe disposed in the bag and coupled to the filter chamber and the liquid outlet member, the liquid outlet pipe being configured to flow the liquid filtered by the filter to the liquid outlet section; and a liquid flow path section in which a flow path for the liquid is formed, the liquid flow path section being provided separately from the liquid outlet section and communicating with an inside of the bag, wherein the liquid outlet pipe has flexibility, and the liquid flow path section is mounted on the other end of the bag, opposed to the one end of the bag.

2. A liquid container comprising:

a bag having flexibility configured to store liquid inside;

a liquid outlet member attached to one end of the bag and having a liquid outlet section to discharge the liquid to a liquid ejecting apparatus;

a spacer member disposed in the bag, the spacer member including a filter chamber in which a filter that filters the liquid is disposed;

a liquid outlet pipe disposed in the bag and coupled to the filter chamber and the liquid outlet member, the liquid outlet pipe being configured to flow the liquid filtered by the filter to the liquid outlet section;

a liquid flow path section in which a flow path for the liquid is formed, the liquid flow path section being provided separately from the liquid outlet section and communicating with an inside of the bag; and an adapter detachably attached to the liquid outlet member, the adapter being configured to couple the liquid outlet member to the liquid ejecting apparatus, wherein the liquid outlet pipe has flexibility, the liquid flow path section is formed in the liquid outlet member, the liquid flow path section has a flow path port which is opened in a surface of the liquid outlet member, and the adapter has an occluded section that covers the flow path port.

* * * * *